Figure 1:
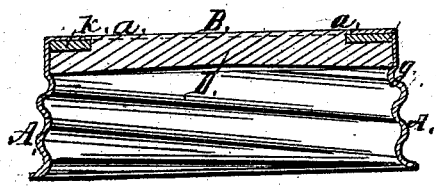

L. R. BOYD.
Cap for Preserve Jars.

No. 89,845.

Patented May 11, 1869.

Witnesses.
H. P. Sanders
A. R. Ely

Inventor.
Louis R. Boyd

UNITED STATES PATENT OFFICE.

LOUIS R. BOYD, OF NEW YORK, N. Y.

IMPROVED CAP FOR PRESERVE-JARS.

Specification forming part of Letters Patent No. 89,845, dated May 11, 1869.

*To all whom it may concern:*

Be it known that I, LOUIS R. BOYD, of the State, county, and city of New York, have invented a novel and Improved Style of Cap or Cover for Preserve-Jars; and I hereby declare that the following is a full, clear, and exact description thereof, reference being had to the drawing which accompanies and forms a part of this specification.

Figure 2:
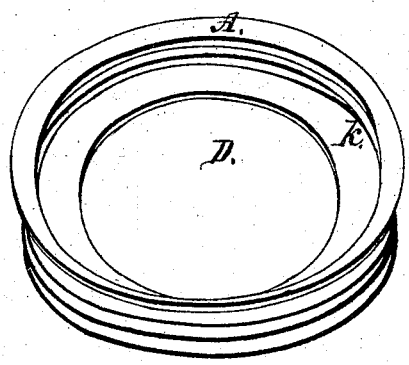

Of this drawing, Figure 1 is a vertical section taken through the center of one of my improved caps. Fig. 2 is a perspective view of the same cap, showing its interior.

The nature of this invention consists in providing a cap or cover, made partly of metal and partly of glass or other vitreous substance, permanently secured to the metal, to be used for closing the tops of preserve-jars and other analogous vessels, whereby I produce an article having a neat and extremely ornamental appearance, so that it is rendered very attractive to purchasers and users, while at the same time it is free from the liability of imparting a disagreeable flavor to the contents of the jar, which often arises from the corrosion of the ordinary metallic caps, and can also be manufactured very readily and cheaply.

The example of cap represented in the drawing, and which embodies my invention, is shown with its metal portion made in the form and manner of the corresponding portion of the well-known "Mason jar" screw-cap, and is the kind which I prefer, although other styles of cap may be employed with my improvement, if desired.

A is the body of the cap, made of sheet metal, and having a screw-thread impressed upon it in the way ordinarily practiced with caps of this class.

Instead, however, of having the metal top B of the cap closed across its entire diameter, as usual, I make it somewhat in the form of a so-called "screw-nozzle," with an aperture, *a a*, of a diameter, say, a fourth of an inch, or any other desired degree less than that of the body of the cap; and then I introduce a disk or plate of glass or other vitreous substance, D, of any suitable thickness, into the cap in such a manner that it will extend across or nearly across the cap, and will close the aperture *a a*, forming a top to the cap and giving it a very highly finished and ornamental appearance.

In order to fasten the plate D permanently into the cap, I usually spin a slight shoulder, *g*, in the latter, which will be found a simple and ready way to hold the plate; but it may be retained by other means, or plaster or cement may be employed to secure it.

For the purpose of making the joint between the disk or plate and the cap air-tight, I have used a washer or gasket of india-rubber or other suitable material, *k*, placed underneath the disk and between it and the metal of the cap, as shown in the drawing. This will be found to answer well, or any proper cement may be applied to accomplish the same object.

I prefer that the glass or other vitreous substance of which the disk or plate D is formed should be transparent, in order that the contents of the jar or vessel may be visible through the cap, as this is considered an advantage by housewives and other users.

My improved cap will be found to combine the conveniences of caps made wholly of metal and those wholly of glass, while it avoids the disadvantages of each, for the metallic caps are liable to become corroded by the acid elements of the contents of the jar, and to impart an unpleasant taste to them, and the caps wholly of glass are not adapted to work satisfactorily upon glass jars, and are very expensive, and constantly in danger of breaking, whereas my improvement will answer all the purposes of the best caps in market, and is far more ornamental and attractive to purchasers than any other which has yet been introduced.

Having thus described my invention, what I claim, and desire to secure by Letters Patent, is—

The within-described cap for jars and other articles, formed partly of metal and partly of glass or other vitreous substance, permanently secured to the metal, whether such cap is or is not provided with a rubber gasket or equivalent between the glass or vitreous substance and the metal.

LOUIS R. BOYD.

Witnesses:
H. P. SANDERS.
A. B. ELY.